(12) United States Patent
Rush et al.

(10) Patent No.: US 9,146,312 B1
(45) Date of Patent: Sep. 29, 2015

(54) PRE-PROCESSING SAR IMAGE STREAM TO FACILITATE COMPRESSION FOR TRANSPORT ON BANDWIDTH-LIMITED-LINK

(75) Inventors: Bobby G. Rush, Edgewood, NM (US); Robert Riley, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 914 days.

(21) Appl. No.: 13/115,654

(22) Filed: May 25, 2011

(51) Int. Cl.
*H04N 7/12* (2006.01)
*H04N 11/02* (2006.01)
*H04N 11/04* (2006.01)
*G01S 13/89* (2006.01)
*G01S 13/90* (2006.01)

(52) U.S. Cl.
CPC . *G01S 13/89* (2013.01); *G01S 13/90* (2013.01)

(58) Field of Classification Search
CPC ....................................................... G01S 13/89
See application file for complete search history.

(56) References Cited

U.S. PATENT DOCUMENTS

| 5,680,138 | A | * | 10/1997 | Pritt | 342/169 |
| 6,424,287 | B1 | * | 7/2002 | Doerry et al. | 342/25 R |
| 7,411,540 | B1 | * | 8/2008 | Lopez et al. | 342/25 R |
| 7,498,968 | B1 | | 3/2009 | Bielek et al. | |
| 2008/0121711 | A1 | * | 5/2008 | Blumer et al. | 235/462.01 |
| 2009/0310023 | A1 | * | 12/2009 | Nakayama | 348/584 |

OTHER PUBLICATIONS

P. Eichel, R.W. Ives, Compression of Complex-Valued SAR Images, IEEE Transitions on Image Processing, vol. 8, No. 10, pp. 1483-1487, Oct. 1999.
Eichel, P., Ives, R.W., "Compression of Complex-Valued SAR Images", IEEE Transactions on Image Processing, vol. 8, No. 10, Oct. 1999, pp. 1483-1497.
Wang, Z., Bovik, A.C., Sheikh, H.R., Simoncelli E.P. "Image Quality Assessment: From Error Visibility to Structural Similarity", IEEE Transactions on Image Processing, vol. 13, No. 4, Apr. 2004, pp. 1-14.
Ives, R. W., Eichel, P., Magotra, N., "A New SAR Image Compression Quality Metric", IEEE Trans., pp. 1143-1146, May 1999.
Jao, J. K., "SAR Image Processing for Moving Target Focusing", Proc. 2001 IEEE Radar Conf., May 2001, pp. 58-63.
Rohwer, J.A., "Open-Loop Adaptive Filtering for Speckle Reduction in Synthetic Aperture Radar Images", Sandia Report, Sand2000-1421, Unlimited Release, Jun. 2000.
Doerry, A.W., "Anatomy of a SAR Impulse Response", Sandia Report SAND2007-5042, Unlimited Release, Aug. 2007, pp. 1-40.
Reddy, B.S., Chatterji, B.N., "An FFT-Based Technique for Translation, Rotation, and Scale-Invariant Image Registration", IEEE Transactions on Image Processing, vol. 5, No. 8, pp. 1266-1271, Aug. 1996.
Unser, M., Thevenaz, P., Yaroslavsky, L., "Convolution-Based Interpolation for Fast, High-Quality Rotation of Images", IEEE Transactions on Image Processing, vol. 4, No. 10, pp. 1371-1381, Oct. 1995.

(Continued)

*Primary Examiner* — Anner Holder
*Assistant Examiner* — Mikhail Itskovich
(74) *Attorney, Agent, or Firm* — Madelynne J. Farber

(57) ABSTRACT

Pre-processing is applied to a raw VideoSAR (or similar near-video rate) product to transform the image frame sequence into a product that resembles more closely the type of product for which conventional video codecs are designed, while sufficiently maintaining utility and visual quality of the product delivered by the codec.

20 Claims, 3 Drawing Sheets

(56) References Cited

OTHER PUBLICATIONS

Turkowski, K., "Filters for Common Resampling Tasks", http://www.realitypixels.com/turk/computergraphics/papers.html, Apr. 10, 1990.

Yu, Y. et al., "Speckle Reducing Anisotoropic Diffusion", IEEE Transactions on Image Processing, vol. 11, No. 11, pp. 1260-1270, Nov. 2002.

* cited by examiner

PRE-PROCESSING SAR IMAGE STREAM TO FACILITATE COMPRESSION FOR TRANSPORT ON BANDWIDTH-LIMITED-LINK

This invention was developed under Contract DE-AC04-94AL85000 between Sandia Corporation and the U.S. Department of Energy. The U.S. Government has certain rights in this invention.

FIELD OF THE INVENTION

The present work relates generally to delivery of synthetic aperture radar (SAR) image streams such as VidesSAR products and SAR derivative products and, more particularly, to compression of the image streams for delivery on limited capacity communication links.

BACKGROUND

The documents listed below are incorporated herein by reference.
[1] Eichel, P., Ives, R. W., "Compression of Complex-Valued SAR Images" IEEE Transactions on Image Processing, Vol. 8. NO. October 1999
[2] Eichel, P. H., LCDR Ives, R. W., "Very low rate compression of speckled SAR imagery", Sandia Report, SAND97-2383/1, Internal Distribution Only, October 1997.
[3] Wang, Z., Bovik, A. C., Sheikh, H. R., Simoncelli E. P. "Image Quality Assessment: From Error Visibility to Structural Similarity, IEEE Transactions on Image Processing, Vol. 13, NO. 4, April 2004
[4] Ives, R. W., Eichel, P., Magotra, N., "A New SAR Image Compression Quality Metric", IEEE Trans., pp. 1143-1146, May 1999
[5] Salomon, D., "Data Compression: The Complete Reference", Fourth Edition. Springer, 2007, ISBN 9781846286026
[6] Jao, J. K., "SAR Image Processing for Moving Target Focusing", Proc. 2001 IEEE Radar Conf., pp. 58-63
[7] Cumming, I. G., Wong, F. H., "Digital Processing of Synthetic Aperture Radar Data: Algorithms and Implementation", Artech House 2005, ISBN: 9781580530583
[8] Jakowatz, C. V., Wahl, D. E., Eichel, P. H., Ghiglia, D. C., Thompson, P. A., "Spotlight-Mode Synthetic Aperture Radar: A signal Processing Approach", Kluwer Academic Publishers, $4^{th}$ printing, 1999, ISBN 0-7923-9677-4
[9] Rohwer, J. A., "Open-Loop Adaptive Filtering for Speckle Reduction in Synthetic Aperture Radar Images", Sandia Report, Sand2000-1421, Unlimited Release, June 2000
[10.] Doerry, A. W., "Anatomy of a SAR Impulse Response", Sandia Report SAND2007-5042, Unlimited Release, August 2007
[11] Lim, J. S., "Two-Dimensional Signal and Image Processing", Prentice Hall PTR, 1990, ISBN 0-13-935322-4
[12] Reddy, B. S., Chatterji, B. N., "An FFT-Based Technique for Translation, Rotation, and Scale-Invariant Image Registration", IEEE Transactions on Image Processing, Vol. 5, NO. 8, pp. 1266-1271, August 1996
[13] Unser, M., Thevenaz, P., Yaroslaysky, L., "Convolution-Based Interpolation for Fast, High-Quality Rotation of Images", IEEE Transactions on Image Processing, Vol. 4, NO. 10, pp. 1371-1381, October 1995.
[14] Turkowski, K., "Filters for Common Resampling Tasks", www.worldserver.com/turk/computergraphics/ResamplingFilters.pdf, Apr. 10, 1990
[15] Acton, S. T., Yu, Y. "Speckle Reducing Anisotoropic Diffusion", IEEE Transactions on Image Processing, Vol. 11, NO. 11, pp. 1260-1270, November 2002

U.S. Pat. No. 7,498,968 (incorporated by reference herein) describes a synthetic aperture radar (SAR) system that is capable of forming high-resolution SAR images at near video rates, e.g., many times a second. The rate of image update allows users to determine when moving targets start moving, when and where they stop, the direction of motion, and how fast they are moving. Further, the radar shadows of moving targets can be used to determine the position and identity of the targets (including even slow moving targets), and display the target motion from frame to frame. SAR systems and techniques such as described in U.S. Pat. No. 7,498,968 are also referred to herein generally as "VideoSAR".

In airborne SAR systems, the digitized radar return (echo response) from the target scene is often referred to as a phase history. VideoSAR collects a continuous stream of phase histories without a defined aperture center. With no specified aperture center, the stream of phase histories can be processed into any arbitrary aperture. Full-size synthetic apertures with mutually overlapping phase histories, are used to form respectively corresponding images. The overlapping apertures enable the near video frame rate, and each aperture provides the basis for an independent, fine-resolution SAR image. The greater the aperture overlap, the higher the SAR image rate. The images can be displayed and analyzed in sequence, yielding a 'movie-like' appearance of the scene.

The video product produced by VideoSAR is typically either a clip or a stream that contains a relatively large amount of data. A VideoSAR clip product is a file containing a closed set of SAR images, for example, thousands of SAR images captured over a few minutes. A VideoSAR stream product may be a true real-time video constructed as a sequence of SAR images whose length is not known a priori. The number of bytes needed for a typical 2000×2000 pixel high-resolution SAR image is on the order of 3.5 megabytes for an 8-bit SAR intensity image. As an example, assuming a frame rate of 3 frames/second, the bit rate required for transmission of the data would be approximately 84 megabits/second (84 Mbps).

Communication links conventionally available for real time transmission of the data are typically bit rate-limited, and may have an effective bit rate as low as, for example, 1.5 Mbps. Data compression may be implemented to accommodate the bit rate limitations of the transmission link, but the aforementioned high data rates associated with VideoSAR products dictate correspondingly high compression ratios. Consider, for instance, the example of the aforementioned 84 Mbps VideoSAR product transmitted on the aforementioned 1.5 Mbps link. This requires a 56:1 compression ratio, without even accounting for typical communication overhead such as protocol headers, metadata, and data link intermittency. The amount of compression applied may also be quantified in terms of bits/pixel (bpp). For instance, in the aforementioned 35 megabyte VideoSAR sequence example, each pixel represents the scene intensity as an unsigned 8-bit integer (UINT8), and there are thus 8 bits/pixel (8 bpp). The aforementioned 56:1 compression ratio would correspond to compression of the bpp parameter from 8 bpp to about 0.143 bpp. (Note that, all other things being equal, the bpp parameter relates directly to the bit rate of the communication link—multiplying the bit rate of the link by a factor of n results in multiplication of the permitted bpp rate by the same factor n.) By any measure, however, high compression ratios such as mentioned above will of course degrade quality at final display. For example, critical image details are eliminated and unwanted artifacts are introduced.

Commercial-off-the-shelf (COTS) video codecs are appealing due to the transportability of the resulting products, the availability of compatible display client software, and the availability of other features such as multiple product streaming, vector overlays, extensible metadata and multicast delivery schemes. However, the most appealing COTS codecs are typically designed for optimal performance with cinematic and broadcast television content, and consequently are not particularly effective at providing the aforementioned large compression ratios required by VideoSAR.

There are known compression algorithms that provide effective spatial, i.e., intra-frame compression of individual SAR image frames. Compression of VideoSAR products has also been investigated. Examples of various known approaches are described in documents [1], [2] and [3] above. The known approaches typically utilize custom designed codecs that are tailored to the algorithms. Moreover, the known approaches do not addresses temporal compression, i.e., frame-to-frame (inter-frame) compression techniques which, as recognized by the present work, would be useful in conjunction with the aforementioned movie-like nature of VideoSAR products.

Referring again to the aforementioned example of a nominal minimum compression ratio of 56:1, and assuming that each frame of a VideoSAR sequence can be spatially compressed by a factor of 30:1 while maintaining sufficient image quality, the corresponding bpp value would be 0.2667. Temporal compression could help achieve the desired value of 0.143 bpp, but that requires an additional compression ratio of about 1.9:1. (The 30:1 spatial compression ratio and the 1.9:1 temporal compression ratio would multiply to provide the desired 56:1 ratio.) Available COTS codecs are capable of providing spatial and temporal compression.

It is desirable in view of the foregoing to provide for the use of COTS codecs with spatial and temporal compression capabilities to compress highly data intensive image streams, such as VideoSAR products, sufficiently to achieve adequate image quality at the receiver over relatively low capacity communication links.

DETAILED DESCRIPTION

Example embodiments of the present work permit the use of COTS codecs with spatial and temporal compression capabilities to compress highly data intensive image streams (e.g., VideoSAR products or SAR derivative products) for transmission on relatively low capacity communication links, with adequate image quality at the receiver. The image stream is processed upstream of the codec (also referred to as preprocessing the image stream) in manners that limit undesirable compression effects such as elimination of critical image details and introduction of artifacts.

As mentioned above, the present work recognizes that, due to the movie-like nature of VideoSAR, temporal (inter-frame) compression techniques are important, so COTS video codecs that provide both spatial and temporal compression are desirable for compressing VideoSAR and other similar products that contain a sequence of image frames ultimately to be rendered for viewing by an analyst at a desired frame rate. However, as mentioned above, available COTS codecs are typically optimized for high perceptual quality transmission and display of optical (or optical-like) cinematic-style scene content. Moreover, VideoSAR image frames are not inherently optical-like in a spatial sense, and are typically not collected in a manner that resembles cinematic composition. Accordingly, example embodiments of the present work apply preprocessing to a raw VideoSAR product to transform the VideoSAR image frame sequence into a product that resembles more closely the type of product for which the available COTS codecs are designed, without significantly compromising the utility and visual quality of the product delivered by the codec. A primary measure of success is the ability to reduce the bpp required to provide to the receiving image analyst a product having both high utility and high visual quality. A secondary measure of success is the ability to implement the preprocessing in a real-time airborne processing platform.

Figure 1:
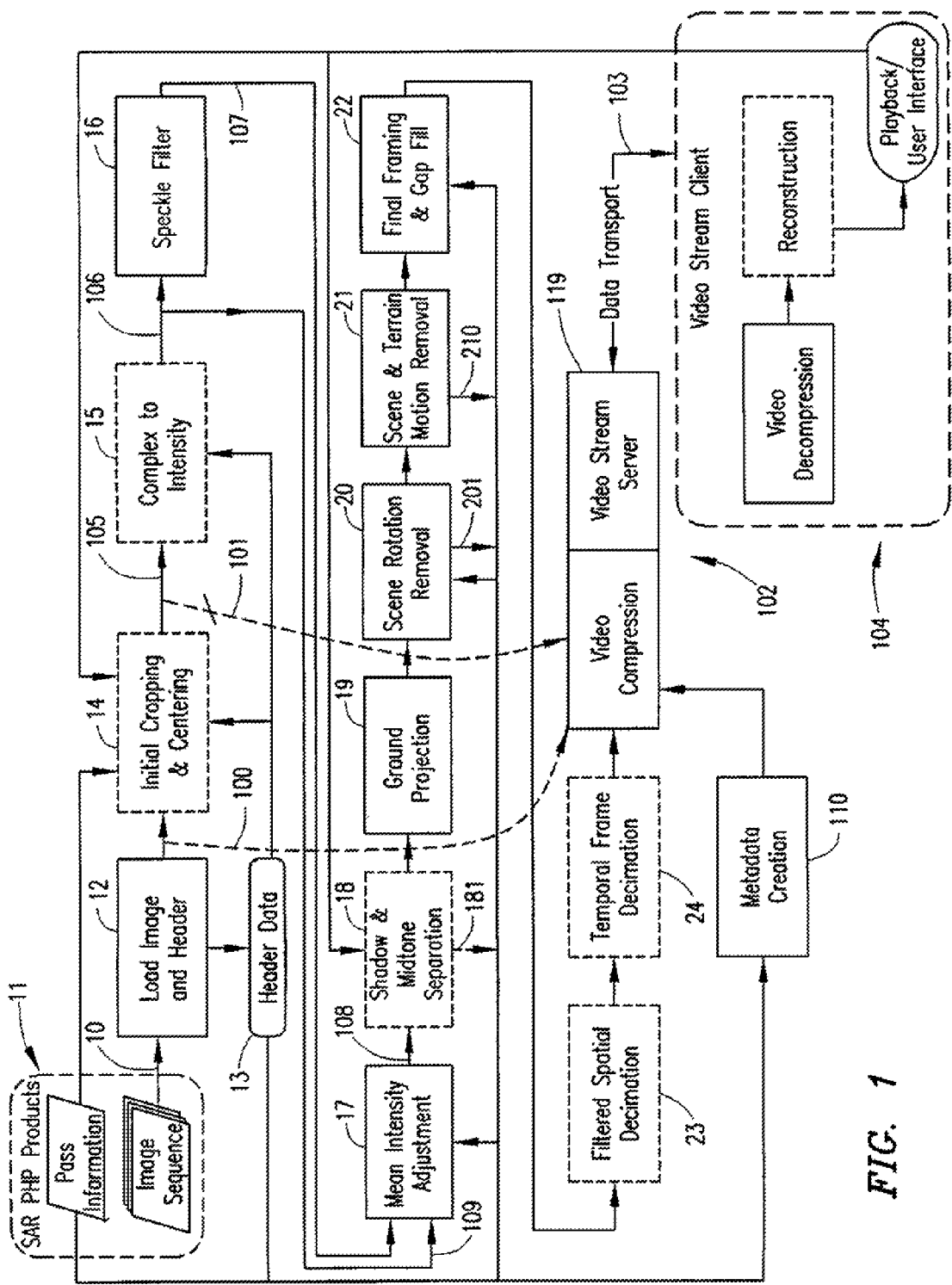
FIG. 1 diagrammatically illustrates a system, according to exemplary embodiments of the present work, for delivering a VideoSAR product or a SAR derivative product to an image analyst via a limited-data rate communication link.

FIG. 1 diagrammatically illustrates a system, according to exemplary embodiments of the present work, for delivering, to an image analyst (user) via a limited data-rate communication link, a VideoSAR product, SAR derivative product, or other similar product that contains a sequence of image frames to be rendered for viewing by the analyst at a desired frame rate. A SAR derivative product is an additional product derived from an original SAR product. One example is a sequence of CCD (Coherent Change Detection) image frames. The VideoSAR example is used hereinbelow for expository purposes, but the structures and operations described are also applicable in conjunction with SAR derivative products.

An airborne SAR acquisition system shown diagrammatically at 11 provides a VideoSAR product as a source sequence 10 of SAR image frames. In various to embodiments, the SAR acquisition system 11 produces the source sequence 10 according to various conventional techniques. In some embodiments, each SAR image frame at 10 is a dual-word 16-bit unsigned integer (UINT16) representation of a complex (e.g., magnitude and phase) image. In some embodiments, each SAR image frame at 10 is a UINT16 representation of an intensity image that has been transformed from a 32-bit representation of a complex image. The acquisition system 11 also provides, for example, the following parameters conventionally associated with the SAR image frame content: the number of range pixels; the number of azimuth pixels; the ordering of the image matrix or image array (in some embodiments, the range and azimuth dimensions are respectively aligned with the rows and columns of the array); information required to transform a complex image to an intensity image; range pixel size in the slant plane (meters); azimuth pixel size (meters); scene grazing angle (degrees); scene frame orientation angle (degrees); and time stamp at aperture center. These parameters are received at 12, together with the image sequence, from the SAR acquisition system 11, and are available (designated as header data at 13) for use in preprocessing the image frame sequence 10. In general, header data such as shown at 13 is typically provided by conventional SAR acquisition systems, and contains, for each image collected, all geometry information required to mensurate that image.

The SAR acquisition system 11 also provides multi-image collection pass information that is generally indicative of the manner in which the phase histories have been collected during the airborne acquisition pass of the system 11. For example, the pass information specifies the planned or desired center of all the images collected from the associated pass, but this will typically not be the actual center due to errors in pointing and GPS. Parameters specifying the flight geometry, range and altitude of the pass are also typically included in the pass information. As shown in FIG. 1, the pass information is provided as metadata (see 110) to be embedded in the video stream (by the video stream server shown at 102), making it available to the analyst at the receiving end of the communication link shown at 103. Some or all of the header data at 13 may also be provided as metadata in various embodiments.

In some embodiments, image sequence preprocessing begins with a crop/center unit 14. If the desired user analysis does not require one or more portions of the image content (at least not at full resolution), or if the desired user analysis requires only certain portions of the image content at full resolution, then the unit 14 may improve processing efficiency by cropping selected portions of the image in accordance with the analysis requirements. In some embodiments, the image formation technique implemented by the SAR acquisition system 11 does not locate the center of the image matrix in proper correspondence to the motion compensation point (typically referred to as the image MCP) of the SAR acquisition pass. In this situation, the crop/center unit 14 implements either zero padding or cropping to align the image matrix center properly relative to the MCP. The image MCP, which is part of the image metadata, is forwarded to the unit 14 for use in the aforementioned alignment operation.

As shown by broken lines 100 and 101 in FIG. 1, some embodiments provide a plurality of preprocessing paths in parallel. Although not explicitly shown, the parallel paths represented by broken lines 100 and 101 respectively contain, in various embodiments, respective instances of various combinations of preprocessing elements provided between the crop/center unit 14 and the COTS codec 102. In this manner, any desired set of image sequences, including, for example, the source sequence 10 and one or more variously cropped and centered sequences (see 105), may be preprocessed in parallel and provided in parallel to the COTS codec 102, which includes a video compression portion and a video stream server portion. In such parallel preprocessing embodiments, the COTS codec 102 is capable of combining the parallel preprocessed image sequences into a single video feed stream for transport on the communication link 103, and the video streaming client 104 at the receive end of the link 103 uses conventional techniques to recover and display the various products contained in the single video feed stream.

In some embodiments, the images of the source SAR image sequence 10 are cropped and/or centered as desired by the SAR acquisition system 11, and the crop/center unit 14 is omitted. The broken line representation of unit 14 indicates its omission in to such embodiments.

In embodiments where the image frames of the source SAR image frame sequence 10 are 32-bit representations of complex images, a transform unit 15 transforms the 32-bit representations of complex images into UINT16 representations of intensity images. In various embodiments, the transform unit 15 receives as input either the source sequence 10 or a modified sequence 105 produced by one of the above-described operations of the crop/center unit 14. The broken line representation of unit 15 indicates its omission in embodiments where the source image frames at 10 are UINT16 representations of intensity images.

In various embodiments, a speckle filter 16 receives either the source sequence 10, or the modified sequence 105, or a further sequence 106 produced by the above-described operation of the transform unit 15. The speckle filter 16 is provided to reduce adverse impacts of speckle relative to compressibility. Speckle is a known high-frequency fundamental component of SAR images that causes a "grainy" appearance when the image is displayed. Although speckle is not noise in the truest sense, the causal process associated with speckle may be modeled as multiplicative noise. Speckle occurs because SAR imaging is coherent, and is typically used to form images of surfaces that are rough in terms of the radar signal wavelength. This rough (relative to wavelength) surface structure results in multiple backscatter responses that sum together for each resolution cell (and thus each pixel). The intensity components attributed to speckle are uncorrelated from pixel-to-pixel, which adversely affects spatial compressibility. Moreover, because VideoSAR produces each image frame with a different geometry, the frames are temporally non-correlated due to speckle, which adversely affects temporal compressibility. Finally, speckle is an aspect of SAR images that differs from the optical-like image models used by COTS video codecs.

In some embodiments, the speckle filter 16 is implemented according to a Two-Dimensional Adaptive Correlation Enhancer Algorithm (2DACE), which is known in the art and described in document [14] above. The 2DACE speckle filter is designed to reduce the pixel-to-pixel variation associated with speckle, while preserving the impulse response (IPR) of point scatterers. Noting that the COTS codec 102 is typically designed for a standard digital data format input, namely an 8-bit integer format, some embodiments of the speckle filter 16 implement an output conversion stage that converts the data format of the filtered image sequence from a UINT16 representation of an intensity image to a UINT8 representation of an intensity image. In some embodiments, the speckle filter 16 scales the images of the received sequence according to a conventional LUT (look up table) linear scale factor before performing filtering.

Figure 2:
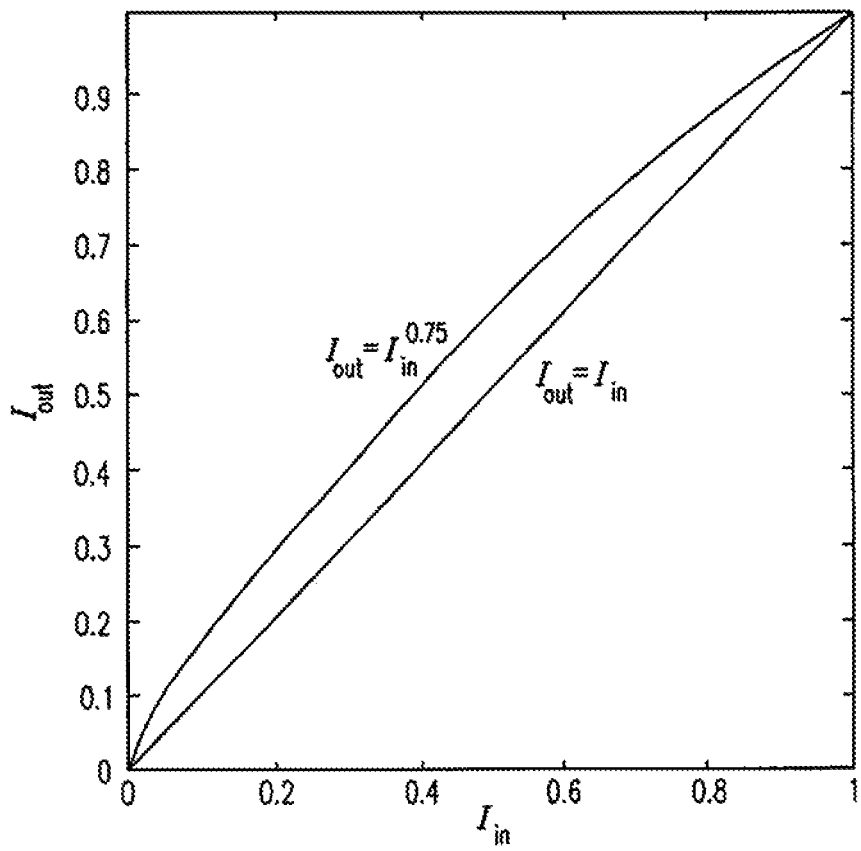
FIG. 2 graphically illustrates pixel intensity adjustment according to example embodiments of the present work.

The speckle filter 16 tends to modify the overall average intensity of the images relative to the images of the source sequence 10, with the effect of darkening the overall brightness of the images. A mean intensity adjustment unit 17 is therefore provided to compensate for this effect by increasing the mean intensity of the images. In various embodiments, the mean intensity adjustment unit 17 uses various conventional techniques for increasing the mean intensity of the images produced by the speckle filter 16. For example, some embodiments use the approach described in document [14] above, which implements an intensity adjustment curve defined as:

$$\tilde{I}_{out} = \tilde{I}_{in}^{\gamma}$$

where $\tilde{I}_{in}$ and $\tilde{I}_{out}$ are respectively floating point type representations of the input and output pixel intensities, normalized to a scale of 0 to 1, and $\gamma$ is a pixel intensity adjustment factor. The input and output pixel intensities are normalized by dividing by $2^8-1$ (255), and restored by multiplying by $2^8-1$. The output 108 of the mean intensity adjustment unit 17 is provided in the same UINT8 data format as the output 107 of the speckle filter 16. The mean intensity adjustment unit 17 effectively adjusts the image brightness without introducing additional saturation or substantively reducing contrast. The plots in FIG. 2 graphically illustrate adjustment of the input pixel intensity $\tilde{I}_N$ when the adjustment factor $\gamma$ is set to an example value of 0.75.

Instead of using a single value of γ for all image frames, some embodiments iteratively adjust the value of γ on a per frame basis until the mean pixel intensity is equivalent to that of the corresponding source image. The value of γ for the nth frame is calculated as:

$$\gamma_n = \log_{10}\left(\frac{\mu_{original}}{2^8 - 1}\right) \Big/ \log_{10}\left(\frac{\mu_{n-1}}{2^8 - 1}\right),$$

where $\mu_{n-1}$ is the mean of the pixel intensities of the UINT8 version of the (n−1)th speckle-filtered, γ-adjusted intensity image frame, and $\mu_{original}$ is a reference mean value. For each iteration, the value of γ is obtained by comparing
(1) the pixel intensity mean of the immediately preceding speckle filtered, γ-adjusted image produced using γ from the immediately preceding iteration
to
(2) the reference mean value $\mu_{original}$.

In some embodiments, $\mu_{original}$ is determined by selecting a reference image from the unfiltered image stream (the image stream that is input to the speckle filter 16), and calculating the mean of the pixel intensities of the UINT8 version of the selected reference image. For this purpose, the unfiltered image sequence may be provided as input to mean intensity adjustment unit 17, as shown at 109. In some embodiments, the unit 17 selects the initial image of the unfiltered image sequence at 109 as the reference image. In some embodiments, the unit 17 periodically samples the unfiltered image sequence at 109, so the reference image (and thus $\mu_{original}$) is periodically updated. The unit 17 converts the reference image from UINT16 to UINT8 to facilitate the comparison to the UINT8-formatted images provided at 107 by the speckle filter 16. In some embodiments, the value of $\mu_{original}$ specified by the user analyst.

The initial value, $\gamma_0$, of the adjustment factor γ may be set as desired. For instance, some embodiments use the FIG. 2 value of 0.75 for $\gamma_0$. In general then, for a given iteration N (i.e., when n=N), the adjustment may be expressed as:

$$\tilde{I}_{out} = (((\tilde{I}_{in}{}^{\gamma 2})^{\gamma 2})^{\gamma 2} \ldots)^{\gamma N}.$$

Some applications (for example, where observing the presence or motion of shadows with relatively small pixel extent is important) benefit by increasing the contrast between subtle shadow regions and surrounding clutter. Some embodiments therefore include an intensity separation unit 18 that provides contrast adjustments to separate clutter from shadows and/or mid-tones. The separation unit 18 applies to the images of the sequence a contrast adjustment in accordance with a sigmoid-shaped curve (S-curve) having an inflection point (where the input and output intensities are approximately equal) at a suitable, relatively dark intensity level. As shown in FIG. 1, the output 109 of the mean intensity adjustment unit 17 is the input of the separation unit 18.

Figure 3:
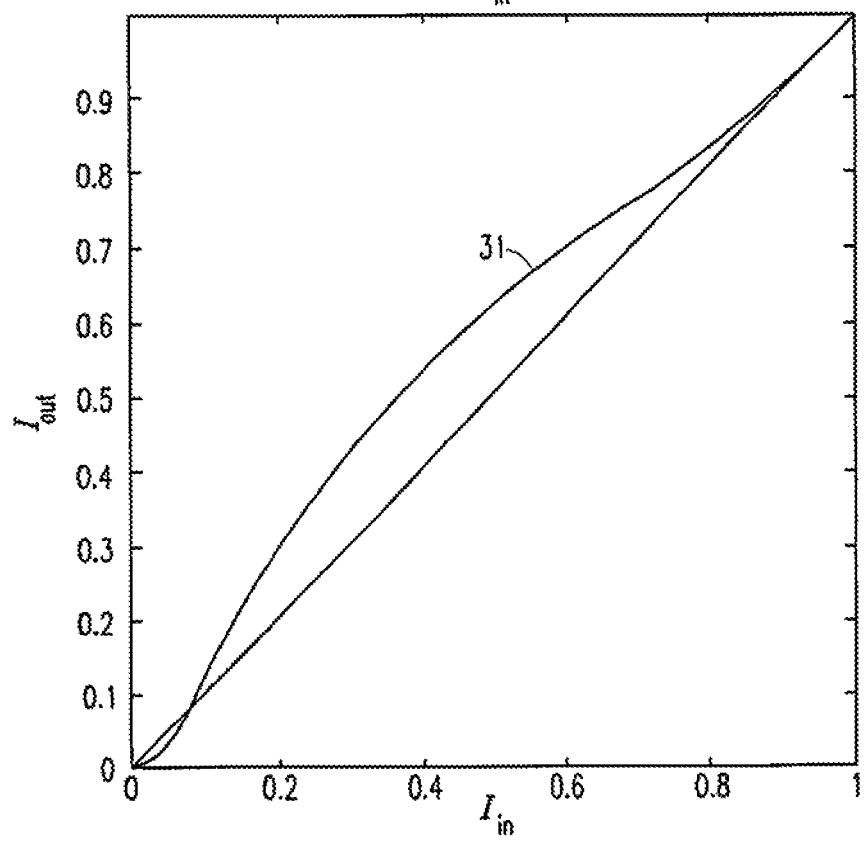
FIG. 3 graphically illustrates shadow contrast adjustment according to example embodiments of the present work.

FIG. 3 illustrates a contrast adjustment curve 31 used by the unit 18 in some embodiments. The curve 31 of FIG. 3, where $I_{in}$ is input pixel intensity and $I_{out}$ is output pixel intensity, focuses on shadow separation, and has its inflection point at (normalized) intensity 0.06. In general, local content is reduced for the intensity regions where the curve slope is less than 1, and is enhanced for the intensity regions where the curve slope is greater than 1. The curve 31 thus exhibits a slight loss of local content (i.e., texture detail) for regions with intensity values predominantly approaching zero. However, these tend to be shadow regions, which carry little or no detail, so the loss of local content is acceptable. In general, the inflection point for shadow-focused separation is selected such that true shadow regions are darkened, and nearby clutter levels are brightened, thereby enhancing the visibility of the shadow boundary.

In some embodiments, the inflection point is calculated based on grazing angle and mean clutter levels. In some embodiments, the effect of the contrast adjustment is preserved in the image displayed for user analysis. In some embodiments, the adjustment (i.e., curve) parameters are embedded as metadata (see 181) in the video stream so that the effect of the contrast adjustment curve may be selectively reciprocated by the user to remove the contrast adjustment. Contrast adjustment for shadow/mid-tone separation as described above may be expected to degrade the compressibility of the image sequence, but the compressibility cost may be offset by corresponding benefits in analysis utility. The separation unit 18 is shown by broken line to indicate its omission where, for example, observing the presence or motion of shadows with relatively small pixel extent is not important.

SAR imaging typically projects onto a two-dimensional image plane backscatter centers that are distributed in three spatial dimensions within a scene. This image plane, or slant plane, has a three-dimensional spatial orientation defined by the aperture collection path and the grazing angle at the scene center. For a circular collection path, at appreciable grazing angles, scene content oriented along the range direction progressively migrates to orientation along the azimuth direction, and vice versa. This progressive migration affects all pixels of each image in the sequence, and manifests as extraneous frame-to-frame scene motion information. Furthermore, the pixel spacings in the azimuth and range directions typically have different spatial scales, even in the slant plane. This further exacerbates the pixel migration phenomenon, introducing even more extraneous scene motion information.

A ground projection unit 19 uses conventional techniques to project each image to a common horizontal ground plane. In some embodiments, the ground projection unit 19 re-samples along either the azimuth or range direction (e.g., the direction whose pixel spacing is greater) so that the range and azimuth pixel spacings are equivalent. The ground projection (together with re-sampling in some embodiments) can minimize, in the first order, the aforementioned extraneous frame-to-frame scene motion information introduced by the slant plane projection.

For circular flight paths, it is common for the available range extent of the scene to exceed significantly the azimuth extent, especially after ground plane projection. The compressed imagery, and the display viewport used for analysis, are rectangular (i.e. not a circle), and limit the number of row and column pixels that can actually be displayed. Accordingly, some scene content may only be displayable for a small percentage of the entire pass. Such content is likely not critical for analysis. Some embodiments of the ground projection unit 19 therefore suitably crop each frame to reduce the difference in the range and azimuth extents. Some embodiments equalize the range and azimuth extents. Some embodiments provide, as embedded metadata in the video stream, geometric parameters such as the geospatial location of the center of each frame (and, if different, the geospatial location of the original scene center), the azimuthal orientation of each frame, the grazing angle, and the pixel spacing These parameters assist a user analyst in making spatial measurements and locating targets.

In some embodiments, the ground projection unit 19 receives as input the output of the contrast adjustment unit 18.

In some embodiments, the ground projection unit 19 receives as input the output 108 of the mean intensity adjustment unit 17.

For a VideoSAR sequence collected along a circular flight path, stationary scene content in each frame will be rotated relative to the scene content in the adjacent frames in the sequence. Scene content at one particular pixel location in one frame will be shifted to another pixel location in the next frame. The magnitude of this location shift will be proportional to the range extent of the pixel from the scene center. In discrete SAR image analysis, this can be advantageous because shadows will always be cast in far range (usually either towards the top or the bottom of the image) and, in the case of a circular collection path, layover from buildings and other objects with height will always be towards the opposite direction (assuming the composite velocity vector coincides with the cross-range direction). This accelerates an analyst's ability to become orientated with respect to the scene. However, this extraneous motion is not typically critical for VideoSAR analysis. Although some COTS video codecs employ compression techniques than can predict both linear and rotational motion and take advantage of that prediction, these techniques require encoding extraneous information that could be applied towards encoding essential scene content, and hence will impact scene quality for a given bit rate budget.

As shown in FIG. 1, a scene rotation removal unit 20 receives (in some embodiments) the output of the ground projection unit 19 and removes the scene rotation phenomenon. Each image frame is rotated back/forward to a common rotational orientation relative to the scene center such as, for example, the rotational orientation of the initial frame in the sequence, or any other selected orientation (e.g., North up). Various embodiments use various conventional techniques to remove the scene rotation. For example, some embodiments use successive skew and shift operations, while others use Fourier domain rotation schemes. In some embodiments, the rotation removal operation maintains the output at the same frame size as the input, which can cut off corners at the frame boundaries. Accordingly, zero intensity fields are introduced towards the output frame corners as the underlying scene rotates.

Some analysts may be accustomed to working with rotating scene content. Accordingly, some embodiments provide scene rotation angles and centers as embedded video stream metadata (see 201) so that the video streaming client 104 may selectively reciprocate the scene rotation removal prior to display.

Terrain layover produces a phenomenon of apparent motion in the scene image. This effect is manifested by what appear to be sea wave-like motions in the scene as the image sequence is displayed. Different locations in the scene whose heights differ from the assumed scene height by respectively different amounts will exhibit differing amounts of motion in differing directions. The range and directions of motion in image sub-regions can vary greatly during a circle collection pass. If maximizing displayed image quality in a constrained data link environment is critical, then it may be advantageous (although relatively expensive from a computational standpoint) to remove this extraneous motion. Some embodiments therefore include a scene and terrain motion removal unit 21.

Figure 4:
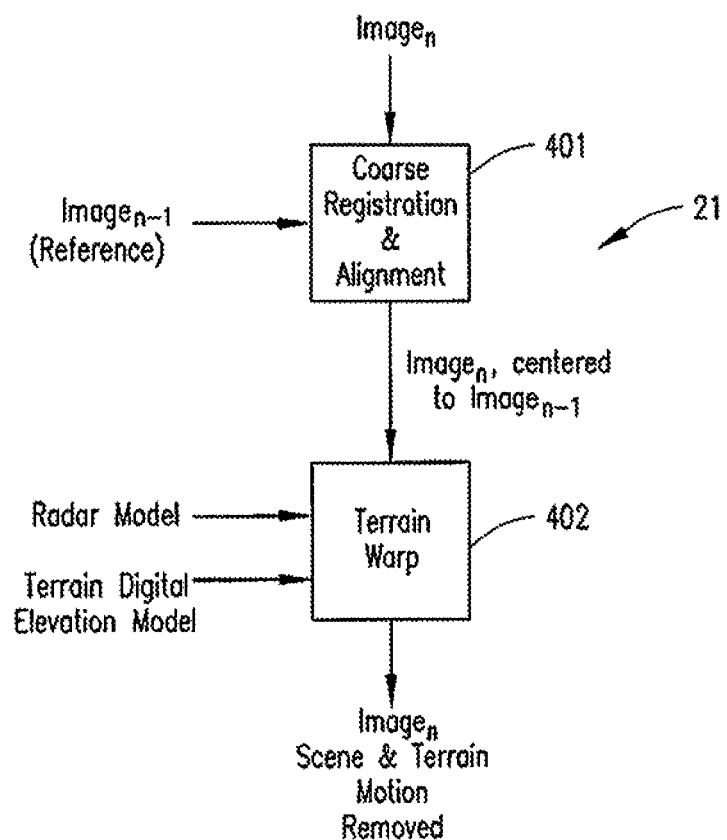
FIG. 4 diagrammatically illustrates the scene and terrain motion removal unit of FIG. 1 in more detail according to example embodiments of the present work.

Removal of scene and terrain motion, as performed by the unit 21, is conceptually straightforward, as illustrated by the example embodiment shown in FIG. 4. As shown, images of the input sequence (received, e.g., from the output of scene rotation removal unit 20) are first processed for coarse registration and alignment at 401. This process, akin to digital jitter removal, effectively aligns one image with another so that in essence their centers are aligned. The desired effect is to minimize coarse level range positioning differences/drifts, between the two images.

Although coarse registration and alignment is used in conventional SAR technology, and in general image processing technologies, for example image fusion, image stitching, etc., an expository example follows, with reference to FIG. 4. In some embodiments, the coarse registration and alignment unit 401 identifies multiple tie points (row and column pixel location of a point feature) that are common between two consecutive image frames ($Image_{n-1}$ and $Image_n$) of the input sequence, and then estimates, for each tie point, the row and column pixel index differences between the images. Small image chips centered around the respective tie points are used to apply cross-correlation processing between $Image_{n-1}$ and Image to estimate inter-frame the pixel location shift associated with each tie point. $Image_{n-2}$ is then pixel-shifted in the row and column sense by the arithmetic average of the estimated pixel location shifts between $Image_{n-1}$ and $Image_n$ ($Image_{a-1}$ having already been shifted relative to $Image_{n-2}$, etc.). This compensates for relative pixel location shifts between the two images. Image, is thus co-aligned with $Image_{n-1}$ in an average sense. Although the foregoing example co-aligns two consecutive images, the process can be readily extended to co-align a larger sub-sequence of images within the input sequence.

After coarse registration and alignment at 401, terrain warp processing is applied by terrain warp unit 402. Terrain warping is effectively an ortherectification step, which is used in conventional SAR technology. Utilizing a radar model associated with the image, and a terrain digital elevation model (DEM) that covers the terrain surface captured in the image, conventional terrain warping maps the range/azimuth SAR image to some uniform rectangular grid (such as UTM). In some embodiments, the DEM has data points that are aligned with the uniform rectangular grid. In some embodiments, the terrain warp unit 402 interpolates the DEM data points to locations in the uniform to rectangular grid. The radar model provides the range to the center of the scene, the height and location of the radar at the center of the aperture, the grazing angle of the image plane, the orientation of the image, and the range and azimuth (cross-range) pixel spacing. The terrain warp unit 402 uses these radar model parameters in conjunction with the DEM, according to conventional techniques, to determine a relationship between each SAR image pixel and a corresponding location in the uniform rectangular grid. Interpolation is then used to map each SAR image pixel to its corresponding location in the grid, thereby producing an output image with terrain and scene motion removed.

In some embodiments, the terrain and scene motion removal unit 21 provides, as embedded metadata (see 201 in FIG. 1) in the video stream, information indicative of the row/column pixel shift performed by the coarse registration and alignment unit 401. This information would be needed at the receiver if it is desired to reciprocate scene rotation removal (performed by the unit 20), because the row/column pixel shift will have relocated the scene center relative to what was used for rotation removal.

As mentioned above relative to the scene rotation removal unit 20, gaps in coverage may be introduced towards the corners and edges of each frame. Some embodiments simply leave the gaps in place and visible to the analyst. Some embodiments include a gap fill unit 22 that addresses the gap issue. In some embodiments, the gap fill unit 22 crops the final frame dimensions to some common size that will likely exclude the gaps. In some embodiments, the gap fill unit 22 performs what can be thought of as a pixel sample-and-hold operation, where each pixel in the frame contains the latest available data for that location in the frame. This of course requires access to the immediately preceding frame processed by the gap fill unit 22 (e.g., by buffering each immediately preceding frame). Some embodiments implement the aforementioned "sample-and-hold" technique, using zero-region masking and 3×3 image dilation.

In many circumstances, the display portal used by the analyst will support substantially fewer pixels than are contained in the frames of a VideoSAR image to sequence, even when preprocessed as described above. The VideoSAR frames received via the communication link 103 may be, for example, on the order of 1,800 to 2,000 pixels in each dimension (or even more in some circumstances). By comparison, for example, the typical vertical extent of display terminals is on the order of 1200 pixels (up to 1600 pixels for large WQXGA displays) and for mobile applications may be as little as 1024 or even 600 pixels. Assuming the analyst must view the entire scene extent represented by the VideoSAR frames on a display terminal that supports less than the scene extent, if the VideoSAR frame sequence is delivered as is, spatial aliasing will occur at the display terminal. Some embodiments therefore include a filtered spatial decimation unit 23 to apply filtered spatial decimation (i.e. anti-aliased image size reduction) to the image frames prior to delivery to the codec 102 for compression and transmission.

Some embodiments of the filtered spatial decimation unit 23 employ the Lanczos $3^{rd}$ order filter kernel, to implement filtered spatial decimation. Lanczos resampling, a windowed sinc filter interpolator, is capable of maintaining fine features during reduction, and without introducing excessive blurring or significant ringing during enlargement. Some embodiments of the filtered spatial decimation unit 23 use other image size reduction techniques, such as bicubic interpolation (weighted for high acuteness). Some embodiments provide the original frame size (prior to the filtered spatial decimation) as embedded video stream metadata, so the video stream client can reciprocate the filtered spatial decimation if desired by the analyst.

With filtered spatial decimation, aliasing may be minimized or eliminated at the display terminal and, when using appropriate window functions, important texture and edge details can actually be maintained. Moreover, filtered spatial decimation can substantially reduce the data rate required to send products of a given quality level at a given frame rate to the end user.

In some situations, real-time delivery of high-quality, large-extent scenes is required, but the communication link 103 provides throughput that is relatively much lower (and possibly only during intermittent periods of time). Some embodiments therefore include a temporal frame decimation unit 24 to enhance the visual quality of the delivered and displayed products. In some, embodiments, the temporal frame decimation unit 24 removes discrete frames from the VideoSAR sequence, according to a periodic pattern of frame removal, before delivery to the codec 102 for compression and transmission.

In some embodiments, the COTS codec 102 is an H.264 codec. Some embodiments adaptively adjust the key frame rate (i.e., the group of pictures, or GOP, length) of the codec 102 according to variations in the effective data throughput rate supported by the communication link 103, video streaming client 104 and video streaming server 119.

As mentioned above, in various embodiments, the effects of various operations, such as shadow and mid-tone separation, scene rotation removal and filtered spatial decimation, are reciprocated at the video streaming client 104. In such embodiments, the video streaming client 104 must of course be capable of parsing out the appropriate metadata for each frame, and performing the desired reciprocations prior to display/analysis. These capabilities are readily provided using conventional COTS software libraries and user interfaces. If the streamed video content is to be saved as a video clip and later transported from the client 104 to a different location for analysis, the desired reciprocations may be performed before the clip is saved. A suitable COTS video client at the different location may then present the already-reciprocated video clip for analysis.

Although exemplary embodiments of the present work are described above in detail, this does not limit the scope of the present work, which can be practiced in a variety of embodiments.

What is claimed is:

1. An apparatus for processing a sequence of synthetic aperture radar (SAR) image frames to facilitate compression of the sequence for transmission on a communication link, the apparatus configured to perform a plurality of acts, the plurality of acts comprising:

receiving, at the apparatus, an input sequence of input SAR image frames that each contain scene content represented as a corresponding array of pixel intensity values, wherein the apparatus is located on an aircraft;

processing, at the apparatus, each of a plurality of said input SAR image frames to produce from said input sequence a plurality of processed image frames in an output sequence that is to be viewed at a viewing frame rate, the processing includes:

cropping at least one image in the plurality of said input SAR images to equalize range and azimuth extents across the plurality of said input SAR images; and rotating at least one image in the plurality of said input SAR images to a rotational orientation that is shared with at least one other image in the plurality of said input SAR images, the rotational orientation being relative to a center of a scene captured in the plurality of said input SAR image frames; and performing inter-frame compression over the processed image frames to generate a compressed video stream; and transmitting the compressed video stream on a communication link between an airborne processing platform which includes the apparatus and a remotely located ground-station.

2. A method of processing a sequence of SAR image frames to facilitate compression of the sequence for transmission on a communication link, the method comprising:

receiving an input sequence of input SAR image frames that each contain scene content represented as a corresponding array of pixel intensity values;

processing each of a plurality of said input SAR image frames to produce from said input sequence a product comprising a plurality of processed image frames in an output sequence that is to be viewed at a viewing frame rate, the processing includes:

cropping at least one image in the plurality of said input SAR images to equalize range and azimuth extents across the plurality of said input SAR images; and rotating at least one image in the plurality of said input SAR images to a rotational orientation that is shared with at least one other image in the plurality of said input SAR images, the rotational orientation being relative to a center of a scene captured in the plurality of said input SAR image frames; and;

performing inter-frame compression on the product to generate a compressed video stream; and
responsive to performing the inter-frame compression, transmitting the compressed video stream on a communication link between an airborne processing platform which includes the apparatus and a remotely located ground-station.

3. The apparatus of claim 1, wherein processing each of a plurality of said input SAR image frames further comprises:
cropping a portion of at least one image in the plurality of said SAR image frames, wherein the cropped portion is to be displayed at full resolution, while an uncropped portion is to be displayed at a lower resolution than the cropped portion.

4. The apparatus of claim 1, wherein said input SAR image frames are 32-bit representations of complex images, and wherein processing each of the plurality of said input SAR image frames further comprises:
transforming the 32-bit representations of the complex images into UINT16 representations of intensity images.

5. The apparatus of claim 1, wherein processing each of the plurality of said input SAR image frames further comprises:
applying a speckle filter to each of the plurality of said input SAR image frames to reduce pixel-to-pixel intensity variation in each of the plurality of said input SAR images, wherein output from the speckle filter is a plurality of filtered images.

6. The apparatus of claim 5, wherein applying the speckle filter modifies overall average intensity of the plurality of said input SAR image frames, and wherein processing each of the plurality of said input SAR image frames further comprises:
increasing a mean intensity of the plurality of the plurality of filtered images subsequent to the speckle filter being applied to each of the plurality of said input SAR image frames.

7. The apparatus of claim 6, wherein processing each of the plurality of said input SAR image frames further comprises:
adjusting contrast in each image in the plurality of filtered images.

8. The apparatus of claim 1, wherein processing each of the plurality of said input SAR image frames further comprises:
projecting each image in the plurality of said input SAR images to a common horizontal ground plane to enable cropping of the at least one image in the plurality of said input SAR images relative to another image in the plurality of said input SAR images to equalize range and azimuth extents across the plurality of said input SAR images.

9. The apparatus of claim 1, wherein the rotational orientation being relative to a center of a scene captured in plurality of said input SAR image frames.

10. The apparatus of claim 1, wherein processing each of the plurality of said input SAR image frames further comprises:
subsequent to rotating the at least one image in the plurality of said input SAR images, processing the plurality of said input SAR images to remove scene and terrain motion therein.

11. The method of claim 2, wherein processing each of a plurality of said input SAR image frames further comprises:
cropping a portion of at least one of said SAR image frames, wherein the cropped portion is to be displayed at full resolution, while an uncropped portion is to be displayed at a lower resolution than the cropped portion.

12. The method of claim 2, wherein said input SAR image frames are 32-bit representations of complex images, and wherein processing each of the plurality of said input SAR image frames further comprises:
transforming the 32-bit representations of the complex images into UINT16 representations of intensity images.

13. The method of claim 2, wherein processing each of the plurality of said input SAR image frames further comprises:
applying a speckle filter to each of the plurality of said input SAR image frames to reduce pixel-to-pixel intensity variation in each of the plurality of said input SAR images, wherein output from the speckle filter is a plurality of filtered images.

14. The method of claim 13, wherein applying the speckle filter modifies overall average intensity of the plurality of said input SAR image frames, and wherein processing each of the plurality of said input SAR image frames further comprises:
increasing a mean intensity of the plurality of the plurality of filtered images subsequent to the speckle filter being applied to each of the plurality of said input SAR image frames.

15. The method of claim 14, wherein processing each of the plurality of said input SAR image frames further comprises:
adjusting contrast in each image in the plurality of filtered images.

16. The method of claim 2, wherein processing each of the plurality of said input SAR image frames further comprises:
projecting each image in the plurality of said input SAR images to a common horizontal ground plane to enable cropping of the at least one image in the plurality of said input SAR images relative to another image in the plurality of said input SAR images to equalize range and azimuth extents across the plurality of said input SAR images.

17. The method of claim 2, wherein the rotational orientation being relative to a center of a scene captured in plurality of said input SAR image frames.

18. The method of claim 2, wherein processing each of the plurality of said input SAR image frames further comprises:
subsequent to rotating the at least one image in the plurality of said input SAR images, processing the plurality of said input SAR images to remove scene and terrain motion therein.

19. The apparatus of claim 1, further comprising receiving information for each of the SAR images in the plurality of said input SAR image frames, wherein the information comprises at least one of a number of range pixels, a number of azimuth pixels, an ordering an image matrix comprising each of the SAR images, range pixel size in a slant plane, azimuth pixel size, scene grazing angle, scene frame orientation angle, time stamp of aperture center, sequencing of the said SAR images, and information to enable transformation of a complex image to an intensity image.

20. The method of claim 2, further comprising receiving information for each of the SAR images in the plurality of said input SAR image frames, wherein the information comprises at least one of a number of range pixels, a number of azimuth pixels, an ordering an image matrix comprising each of the SAR images, range pixel size in a slant plane, azimuth pixel size, scene grazing angle, scene frame orientation angle, time stamp of aperture center, sequencing of the said SAR images, and information to enable transformation of a complex image to an intensity image.

* * * * *